Patented Mar. 17, 1936

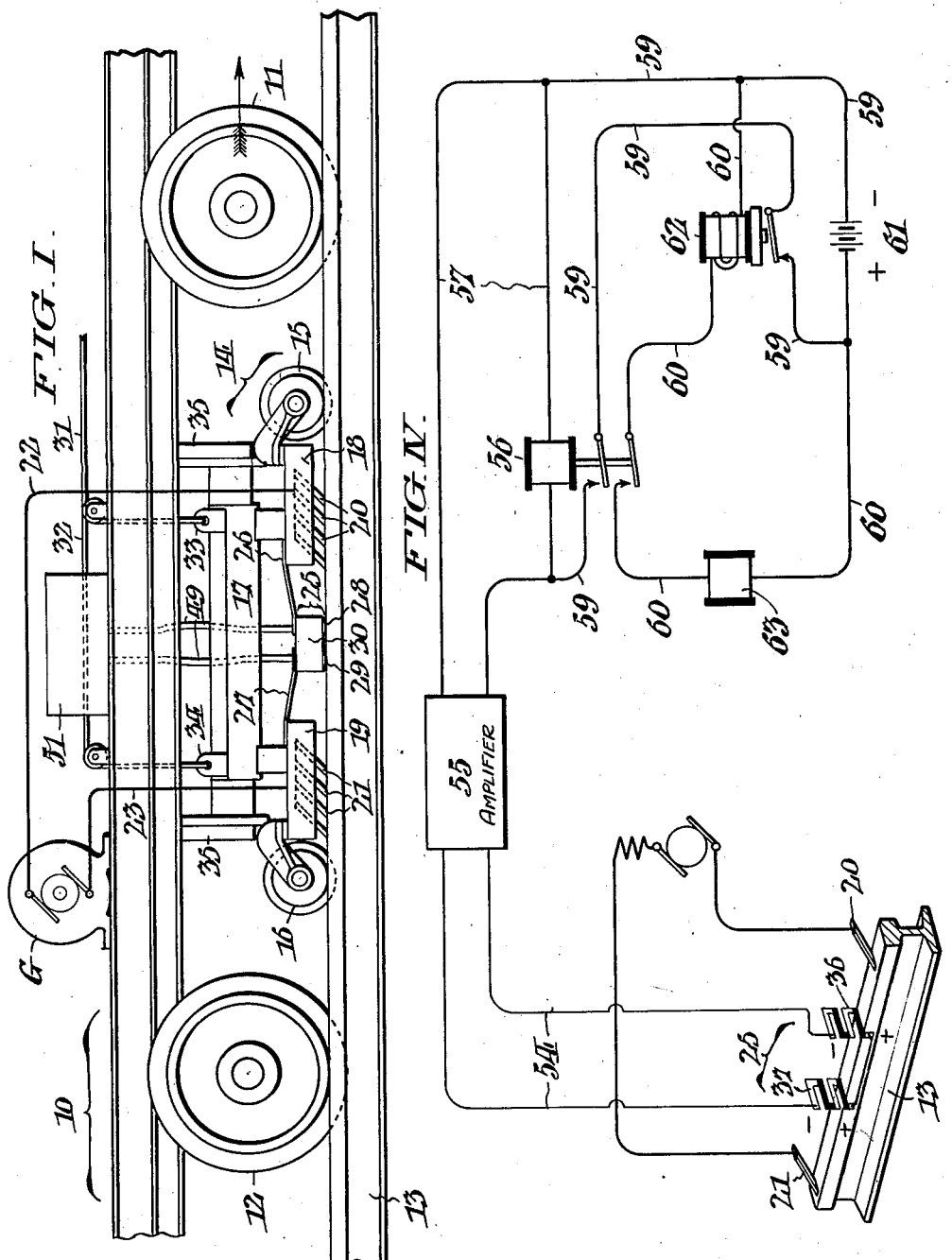

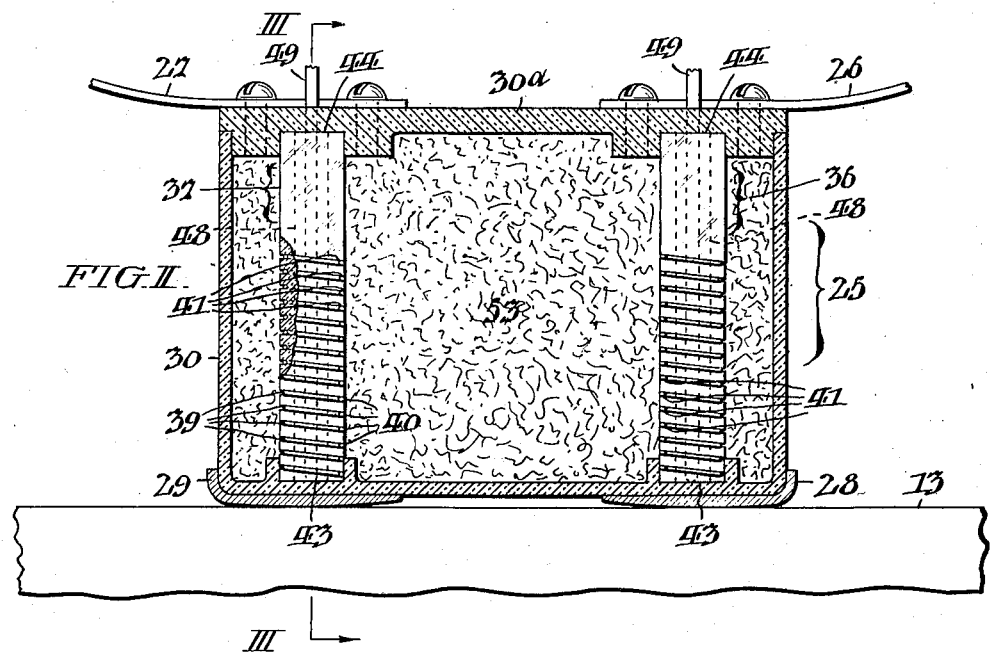
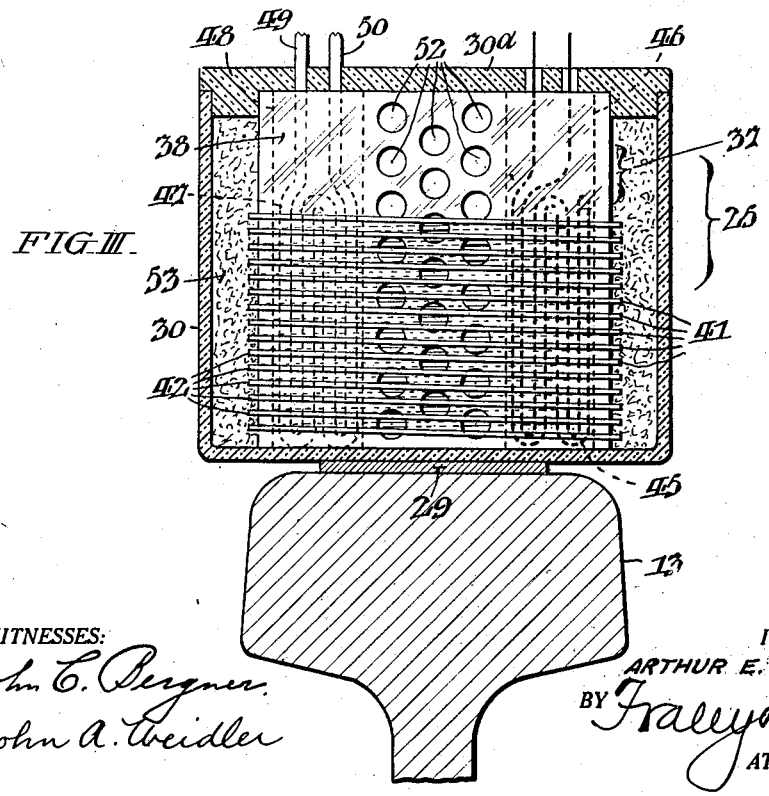

2,034,280

UNITED STATES PATENT OFFICE 2,034,280

RAIL TESTING APPARATUS

Arthur E. F. Billstein, Altoona, Pa., assignor to The Pennsylvania Railroad Company, Philadelphia, Pa., a corporation of Pennsylvania Application July 2, 1932, Serial No. 620,711

11 Claims. (Cl. 175—183)

This invention relates to apparatus for testing railroad rails and the like for hidden cross-sectional imperfections such as blow holes, fissures, etc. More specifically, my invention has reference to testing apparatus of a type wherein, during travel of the apparatus over or along the rails, a flow of electric current is passed locally through each rail with creation of magnetic flux around it; and wherein a detector is affected by variations occasioned in the flux by imperfections in the rail, to influence, through the medium of an amplifier, suitable electrically actuated instrumentalities whereby impulses so received, are recorded.

Apparatus heretofore designed to operate under the principle briefly outlined, I have found lacks sufficient sensitiveness to distinguish accurately and definitely between imperfections of different character, as well as between the imperfections and the breaks or intervals between contiguous rail sections, so that the indications are more or less indistinct and therefore unreliable.

These deficiencies I aim to overcome in part through provision of a highly sensitive thermopile detector which responds readily and quickly to the influence of flux changes to independently produce an electric current of sufficient intensity for amplification to actuate the recording instrumentalities, and which is of such slight thickness that it is not affected by surface irregularities such as burns, corrugations, etc.

A further aim of my invention is to provide for the maintenance of the detector at all times at a predetermined fixed distance from the rail surface similarly for immunity against affectation by low spots or depressions formed at various points along the rails by wear of locomotive drive wheels.

Still another object of my invention is to provide means whereby a slight delay is occasioned in an electric circuit through the recording instrument upon communication of the impulses through the amplifying means, from the detector to afford a slight though ample time period for said recording instrument to function and record properly.

Still other objects and attendant advantages of this invention will be manifest from the detailed description hereinafter of the attached drawings, wherein Fig. I is a fragmentary side elevation of my improved rail testing apparatus.

Fig. II is a longitudinal detail sectional view of the detecting unit of the apparatus which is directly influenced by variations in magnetic flux created locally in the rail.

Fig. III shows a cross section of the detector unit, taken as indicated by the arrows III—III in Fig. II; and Fig. IV is a diagram showing the wiring connections of the apparatus.

As delineated in Fig. I of these illustrations, my improved rail testing apparatus comprises a car 10 with fore and aft supporting trucks whereof the wheels are indicated at 11, 12 respectively, said wheels being of the usual flanged type to run on the rails 13 which are to be tested. Located intermediate the wheels 11, 12 at each side of the car 10, is a smaller supplemental truck 14 with fore and aft flanged wheels 15, 16 which are smaller in diameter than the main truck wheels 11, 12 but which, like the latter, run on the rails 13. To opposite ends of the frame 17 of the supplemental truck 14 are secured blocks 18, 19 of di-electric material carrying multiple brushes 20, 21 to contact with the rails 13, said brushes being connected in circuit with a low voltage generator G on the car 10, through conductors 22, 23. As the car 10 travels along the rail 13 in the direction of the arrow, current obviously flows locally through the rail 13 in the interval between the brushes 20, 21, with attendant creation of a magnetic field around the rail continuously over a corresponding length of the rail.

In addition to the brushes 20, 21, the supplemental truck 14 carries a detector 25 which is supported by means of a pair of flat tongue springs 26, 27, centrally between the insulate blocks 18, 19. As shown, the springs 26, 27 exert downward pressure upon the detector 25 so that rounded bottomed shoes 28, 29, adjacent the lower corners of the casing 30 of said detector, are maintained in light but firm contact with the top surface of the rail 13. For a reason later on explained, the bottom curvature of the contact shoes 28, 29 is made to correspond with that of the treads of standard locomotive drive wheels.

In order that the supplemental truck 14 may be raised clear of the rail 13 incident to transport of the apparatus from one location of operations to another, I have provided a lifting tackle including a pair of cords or cables 31, 32 connected at 33, 34 to opposite ends of the truck frame 17 which latter is confined to vertical movement by guides 35 depending from the body of the car 10.

With reference now more especially to Figs. II and III of the drawings, it will be observed that the casing 30 of the detector 25 is in the form of a rectangular box constructed of a heat resistive di-electric material, preferably "crolite", with a removable cover member or lid 30a of like material. Housed within the casing of the detector 25 is a pair of thermo-pile detector units 36, 37 constituting thermo-electric generators which are adapted to be directly influenced by variations in the flux around the rail 13. As shown, each of these detector units 36, 37 consists of a flat oblong core 38 also molded from "crolite" or other heat resistant di-electric material with oppositely inclined communicating grooves crosswise of its opposite sides whereinto are laid the components 39, 40 of serially arranged thermo-couples. These thermo-couple components 39, 40 may be respectively of an alloy of copper and iron and copper wire, or they may be made of any other dissimilar metals suitable for the purpose; and, as shown in Fig. III, they are joined at opposite corner edges of the core as indicated at 41, 42, with the magnetically sensitive components all lying in one plane. Also as shown in Fig. II, the thermo-pile detectors 36, 37 are placed transversely of the casing 30 in longitudinally spaced relation with their top and bottom edges lodged in recesses 43, 44 respectively afforded by said casing and its lid 30a. For the purpose of maintaining the junctures 41, 42 of the thermo-pile detectors at different temperatures with maintenance of a difference of electrical potential between them, I employ in each instance, a heating coil 45 of asbestos covered wire which is lodged in a vertical opening 46 through the "crolite" core 38 at one end, and a cooling coil 47 lodged in a similar vertical opening 48 at the other end of said core. As shown, the heating coil 45 is wound double to prevent self-induction; and it may be supplied from a separate generator (not shown) on the car 10. The cooling coil 47 of each detector unit is connected by pipes 49, 50 to a suitable refrigerating unit 51 mounted on the car 10. To minimize flow of heat to the cold end of the core 38 and vice versa, I have perforated the central portion of the latter as at 52 in Fig. III. As a further precaution against thermal transmission and radiation, the casing 30 of the detector 25 is packed with suitable thermo-insulating material such as magnesium or the like conventionally indicated at 53.

As diagrammatically illustrated in Fig. IV of the drawings, the thermo-pile units 36, 37 of the detector 25 are connected so as to oppose each other, that is to say, the positive terminal of one unit is connected to the positive terminal of the other. Normally, therefore, no current will flow in the circuit 54 (Fig. IV) in which the detector 25 is interposed with an amplifying unit conventionally indicated at 55. The output of the amplifier 55 I utilize to actuate a control relay 56 in a primary circuit 57, said relay controlling two secondary circuits 59, 60. Interposed in the secondary circuit 59 is a battery 61; and said circuit is governed by a time relay 62, which, with a suitable recording device whereof the actuating magnet is indicated at 63, is connected in the secondary circuit 60.

The operation of the apparatus is as follows:— As already stated hereinbefore, incident to travel of the car 10, current flows continuously between the brushes 20, 21 with creation of magnetic flux around the rail 13. As the voltage in either one or the other of the thermo-pile units 36, 37 of the detector 25 is changed by variation in the magnetic flux due to transverse fissures or other cross-sectional imperfections in the rail 13, the balance or equilibrium of the circuit 54 to the amplifier 55 is disturbed, and the impulse thereby occasioned is immediately communicated to the control relay 56. By action of this relay 56 the two secondary circuits 59, 60 are simultaneously closed with the result that current is permitted to flow from the battery 61 through the magnet 63 of the recording instrument to indicate the presence of the flow in the rail either on a recording chart or ribbon or on the rail itself, as may be found desirable in practice. Now since the actuation of the control relay 56 through the impulse received from the detector 25 is instantaneous, the control relay 56 would become as quickly de-energized if it were not for the time relay 62 which permits current from the battery 61 to hold the switches operated by the relay 56 closed for a predetermined time interval and so permit the recording device 63 to function properly. For ordinary purposes the time relay 62 may be set to function at 1/400 of a second, at the expiration of which time it will serve to open the circuit through the battery 61 for de-energization of the control relay 56. By its supporting springs 26, 27, the detector 25 is yieldingly depressed so that its shoes 28, 29 bear lightly against the top surface of the rail 13 as already explained; and in this connection it is to be particularly noted from Fig. II that the contact shoes underlie the vertically arranged thermo-pile detector units 36, 37 and have their centers of curvature respectively in the planes of thermo-couple junctions 41, 42. It therefore follows that a uniform spacing is maintained between the lower ends of thermo-pile detector units 36, 37 and the top surface of the rail 13 regardless of irregularities in the latter. Due to being curved to correspond with the curvature of the drive wheels of locomotives, the shoes 28, 29 are capable of accurately following the curvatures of such convex depressions so that here again the spacing between the detecting units 36, 37 and the rail surface is maintained perfectly uniform. As a result of the provisions just explained, the detector 25 is rendered capable of accurately detecting the imperfections in the rail as a consequence of its freedom from disturbance by the surface irregularities in the rail. Such accuracy of detection makes possible the accurate recording of different kinds of imperfections, or in other words, the recordings will vary in accordance with the size and character of the flaws in the rail.

Having thus described my invention, I claim:—

1. A detector for track rail testing apparatus wherein a magnetic flux is produced locally in the rail as the latter is being traversed, comprising a detector unit in the form of a thermo-electric generator adapted to have its voltage changed by variations in the magnetic flux occasioned by flaws in the rail, and indicating means in circuit with the detector unit.

2. A detector for track rail testing apparatus wherein a magnetic flux is produced locally in the rail as the latter is traversed, comprising a detector unit in the form of a thermo-electric generator adapted to have its voltage changed by variations in the magnetic flux occasioned by flaws in the rail, said generator being composed of a number of serially connected vertically arranged thermo-couples disposed transversely of the rail, and indicating means in circuit with the detector unit.

3. A detector for track rail testing apparatus wherein a magnetic flux is produced locally in the rail as the latter is being traversed, comprising a pair of detector units in the form of thermoelectric generators spaced longitudinally of the rail and adapted to have their voltage changed by variation in the flux occasioned by flaws in the rail, said generators being opposingly connected so as to normally neutralize each other, and indicating means in circuit with the detector units.

4. A detector for track rail testing apparatus wherein a magnetic flux is produced locally in the rail as the latter is being traversed, comprising a detector unit in the form of a thermoelectric generator adapted to have its voltage changed by variation in the magnetic flux occasioned by flaws in the rail and composed of a number of serially-connected thermo-couples disposed transversely of the rail, means for maintaining alternate junctures between the dissimilar components of the thermo-pile couples at different temperatures; and indicating means in circuit with said detector unit.

5. A detector for track rail testing apparatus wherein a magnetic flux is produced locally in the rail as the latter is being traversed, comprising a detector unit in the form of a thermo-electric generator adapted to have its voltage changed by variations in the magnetic flux occasioned by flaws in the rail, said unit consisting of a flat vertical core of insulating material arranged transversely of the rail and wire segments of dissimilar metals respectively occupying grooves in the opposite sides of the core and joined at the opposite ends of the core, heating means within a hollow at one end of the core and cooling means in a hollow at the other end of the core whereby the alternate junctures of the thermo-pile segments are maintained at different temperatures, and indicating means in circuit with the detector unit.

6. A detector for track rail testing apparatus wherein a magnetic flux is produced locally in the rail as the latter is being traversed, comprising a di-electric casing, a detector unit in the form of a thermo-electric generator housed within said casing and adapted to have its voltage changed by variations in the magnetic flux occasioned by flaws in the rail, said generator consisting of a number of serially-connected thermo-pile couples vertically arranged transversely of the rail, a rounded shoe on the casing to contact with the rail having the center of its curvature in the plane of the detector unit and conforming to the curvature of locomotive drive wheels whereby said detector unit is maintained at a constant distance from the rail surface irrespective of irregularities therein, and indicating means in circuit with said detector unit.

7. A detector for track rail testing apparatus wherein a magnetic flux is produced locally in the rail as the latter is being traversed, comprising a di-electric casing, a vertically-arranged detector unit within the casing influenced by variations in the magnetic flux occasioned by flaws in the rail, a shoe on the casing in line with the detector unit and rounded to correspond with surface hollows formed in the rail by wear of locomotive drive wheels whereby said unit is maintained at all times at a constant distance from the rail surface, means influential upon the casing to yieldingly maintain the shoe in contact with the rail, and indicating means in circuit with the detector unit.

8. A detector for track rail testing apparatus wherein a magnetic flux is produced locally in the rail as the latter is being traversed, comprising a di-electric casing, a pair of detector units in the form of thermo-electric generators housed within the casing in spaced relation longitudinally of the rail and adapted to have their voltage changed by variations in the magnetic flux occasioned by flaws in the rail, said units being opposingly connected so as to normally neutralize each other, shoes on the casing respectively in line with the detector units and curved to correspond with surface hollows occasioned in the rail by wear of locomotive drive wheels, whereby said units are maintained at all times at a constant distance from the rail surface, and indicating means in circuit with the generator units.

9. A detector for track rail testing apparatus wherein a magnetic flux is produced locally in the rail as the latter is being traversed, comprising a pair of detector units in the form of thermoelectric generators spaced longitudinally of the rail and adapted to have their voltage changed by variation in the flux occasioned by flaws in the rail, said generators being opposingly connected so as to normally neutralize each other, a relay switch interposed in a primary circuit with the detector units, and a secondary circuit controlled by said switch having an indicating means interposed therein together with a switch governed by a time relay in another secondary circuit also controlled by the first mentioned switch.

10. A detector for track rail testing apparatus wherein a magnetic flux is produced locally in the rail as the latter is being traversed, comprising a casing, a vertically arranged thermo-electric detector coil within the casing composed of alternately arranged wire segments of different metals and adapted to be influenced by variations in the magnetic flux occasioned by flaws in the rail, a friction shoe on the casing having its center in the axis of the detector coil and being rounded to correspond with the surface hollows formed in the rail by wear of locomotive drive wheels whereby said unit is maintained at all times at a constant distance from the rail surface, means influential upon the casing to yieldingly maintain the shoe in contact with the rail, and indicating means in circuit with the detector unit.

11. A detector for track rail testing apparatus wherein a magnetic flux is produced locally in the rail as the latter is being traversed, comprising a casing, a pair of vertically-arranged spaced thermo-electric detector coils within the casing composed of alternately-arranged wire segments of different metals and adapted to be influenced by variations in the magnetic flux occasioned by flaws in the rail, contact shoes on the casing respectively having their centers in the axes of the coils and being rounded to correspond with the surface hollows formed in the rail by wear of locomotive drive wheels whereby said units are at all times maintained at a constant distance from the rail surface, means influential upon the casing to yieldingly maintain the shoe in contact with the rail, and indicating means in circuit with the detector unit.

ARTHUR E. F. BILLSTEIN.